United States Patent
Hyde et al.

(10) Patent No.: US 7,990,249 B1
(45) Date of Patent: Aug. 2, 2011

(54) RFID TAG CIRCUITS TAGS AND METHODS FOR BACKSCATTERING WITH CONTROLLABLE ADMITTANCE

(75) Inventors: John D. Hyde, Corvallis, OR (US); Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 1077 days.

(21) Appl. No.: 11/765,552

(22) Filed: Jun. 20, 2007

Related U.S. Application Data

(60) Provisional application No. 60/837,169, filed on Aug. 11, 2006, provisional application No. 60/835,187, filed on Aug. 3, 2006.

(51) Int. Cl.
*H04Q 5/22* (2006.01)
(52) U.S. Cl. .......... 340/10.1; 340/13.26; 340/12.36
(58) Field of Classification Search .......... 340/10.1, 340/5.61, 13.26, 12.37, 12.36, 538.11, 538.14, 340/537; 455/107; 375/315
See application file for complete search history.

(56) References Cited

U.S. PATENT DOCUMENTS

| 7,026,935 | B2 * | 4/2006 | Diorio et al. | 340/572.2 |
| 7,868,482 | B2 * | 1/2011 | Greene et al. | 307/82 |

* cited by examiner

*Primary Examiner* — Vernal Brown
*(74) Attorney, Agent, or Firm* — Turk IP Law, LLC

(57) ABSTRACT

RFID tag circuits, tags, and methods are provided for backscattering a received RF wave using a controllable admittance difference between the ON state and the OFF state. The admittance difference is controlled responsive to a control signal. In some embodiments, the control signal is generated responsive to a command. In others, the control signal is generated responsive to detecting the power level of the received RF wave. In those, the inherent behavior of the admittance difference can be shaped as desired. For example, it can be such that the backscatters with advantageously more power when it is away from the reader, and with less power when it is close to the reader, so as to meet regulatory requirements.

41 Claims, 14 Drawing Sheets

*CONTROLLABLE ADMITTANCE TAG CIRCUIT*

SIGNAL PATH DURING R→T

SIGNAL PATH DURING T→R

CONTROLLABLE ADMITTANCE TAG CIRCUIT

BEHAVIOR OF "ON" STATE ADMITTANCE ACCORDING TO EMBODIMENTS

*CONTROLLABLE ADMITTANCE TAG CIRCUIT*

*CONTROLLABLE ADMITTANCE TAG CIRCUIT*

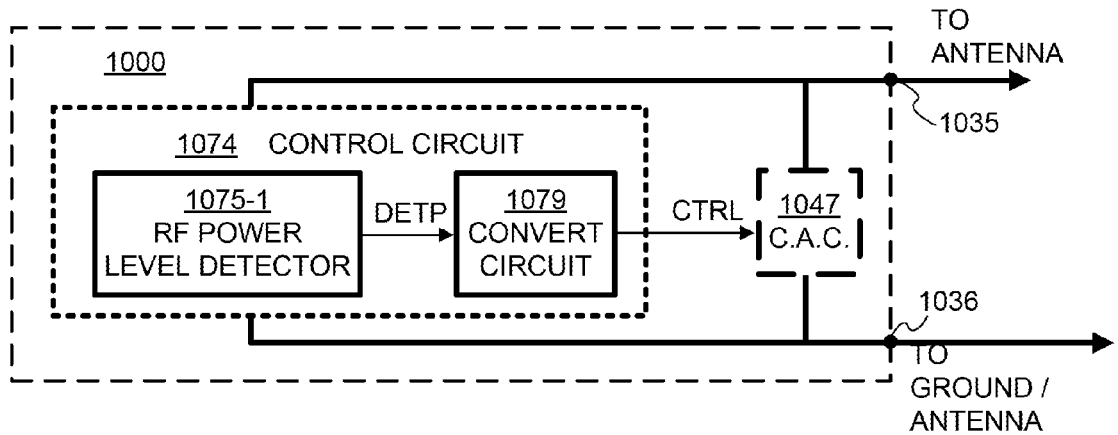
FIG. 10A    CONTROLLABLE ADMITTANCE TAG CIRCUIT
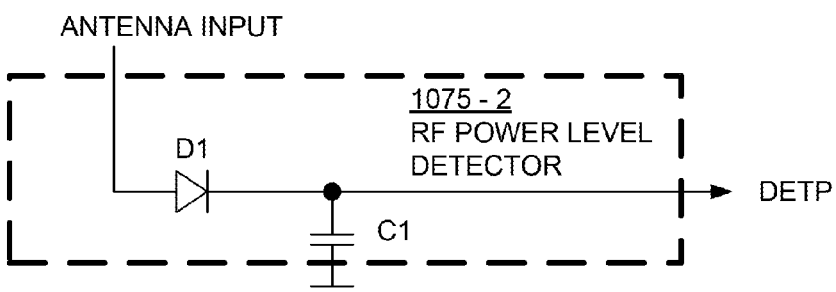
FIG. 10B    RF POWER DETECTOR CIRCUIT 1
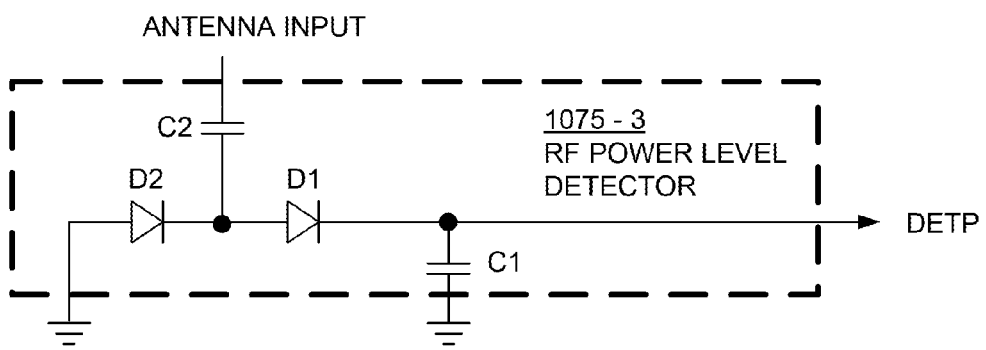
FIG. 10C    RF POWER DETECTOR CIRCUIT 2

*CONTROLLABLE ADMITTANCE TAG CIRCUIT*

*CONTROLLABLE ADMITTANCE TAG CIRCUIT*

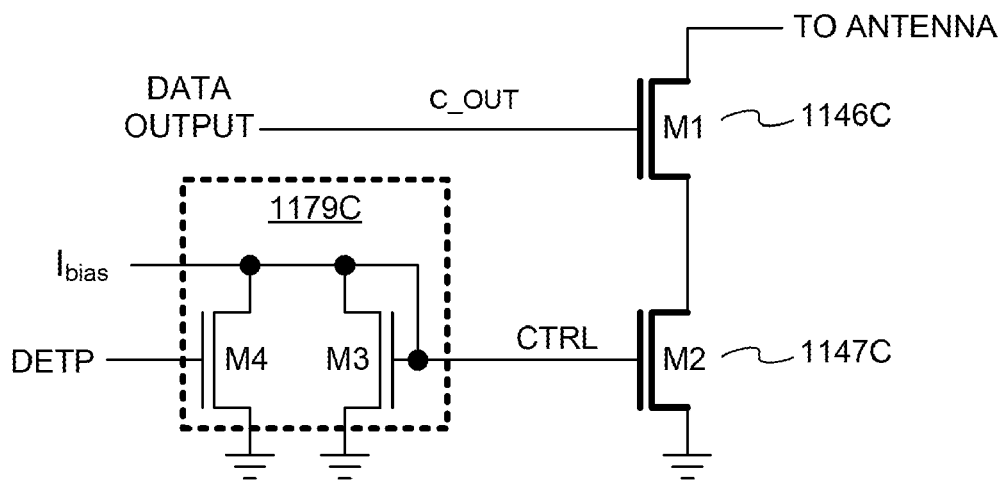
FIG. 11C  CONTROLLABLE ADMITTANCE TAG CIRCUIT
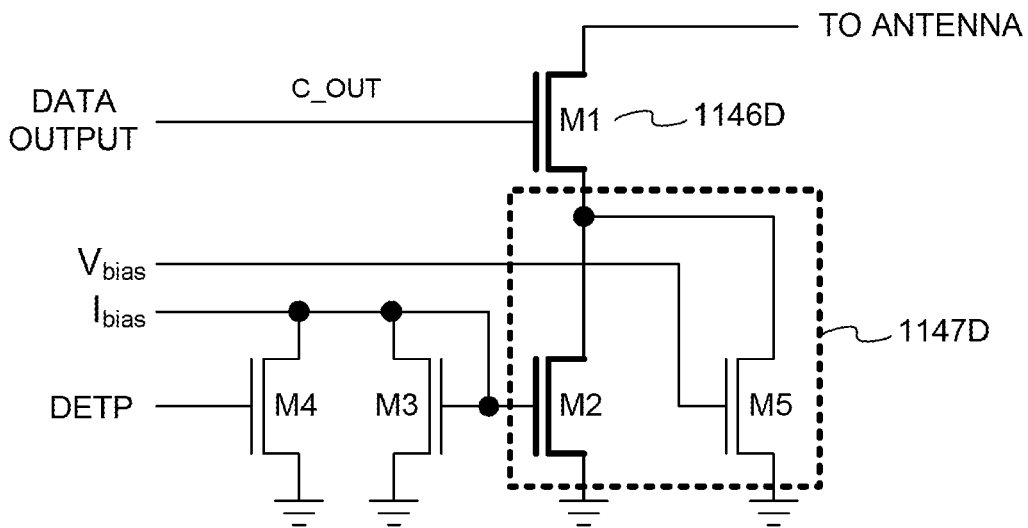
FIG. 11D  CONTROLLABLE ADMITTANCE TAG CIRCUIT

RFID TAG CIRCUITS TAGS AND METHODS FOR BACKSCATTERING WITH CONTROLLABLE ADMITTANCE

RELATED APPLICATIONS

This utility patent application claims the benefit of U.S. Provisional Application Ser. No. 60/837,169 filed on Aug. 11, 2006, which is hereby claimed under 35 U.S.C. §119(e). The provisional application is incorporated herein by reference.

This utility patent application also claims the benefit of U.S. Provisional Application Ser. No. 60/835,187 filed on Aug. 3, 2006, which is hereby claimed under 35 U.S.C. §119 (e). The provisional application is incorporated herein by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

As described, a passive RFID tag receives energy and harvests the received energy to power itself. Then, the tag sends some of the energy/power back by backscattering to the reader. The scattered power is not available to power the tag. The RFID tag backscatter power may sometimes be too weak for good communication with RFID readers having low sensitivity or too strong, which may reduce the available on board power, and therefore the tag's range and reliability. It may also violate regulatory requirements such as those of spectral masks, etc.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to RFID tag circuits, tags, and methods for backscattering a received RF wave using a controllable admittance difference between the ON state and the OFF state. The admittance difference is controlled responsive to a control signal. In some embodiments, the control signal is generated responsive to a command. In others, the control signal is generated responsive to detecting the power level of the received RF wave.

In those embodiments, therefore, the inherent behavior of the admittance difference can be shaped as desired. For example, it can be such that the backscatters with advantageously more power when it is away from the reader, and with less power when it is close to the reader, so as to meet regulatory requirements.

This and other features and advantages of the invention will be better understood in view of the Detailed Description and the Drawings, in which:

BRIEF DESCRIPTION OF THE DRAWINGS

Non-limiting and non-exhaustive embodiments are described with reference to the following drawings.

FIG. 10A is a portion of the block diagram of FIG. 7A, where the control circuit is implemented by an RF power level detector according to preferred embodiments;

FIG. 10B is a schematic diagram of an RF power detector that can be used in the circuit of FIG. 10A according to an embodiment;

FIG. 10C is a schematic diagram of another RF power detector that can be used in the circuit of FIG. 10A according to another embodiment;

FIG. 11C is a schematic diagram of components that can be used in the block diagram of FIG. 11A according to an embodiment;

FIG. 11D is a schematic diagram of components that can be used in the block diagram of FIG. 11A according to an embodiment;

DETAILED DESCRIPTION

Figure 1:
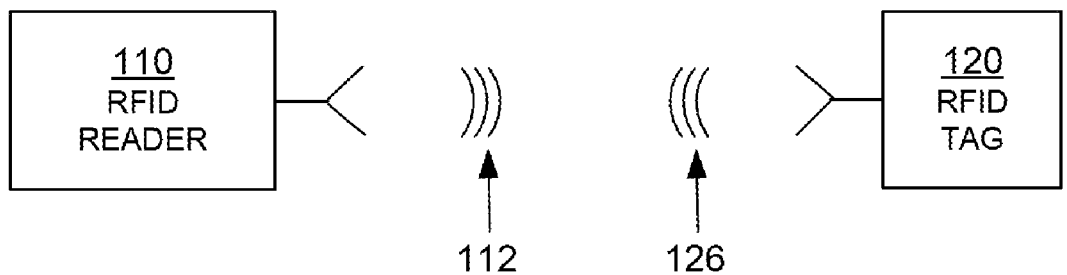
FIG. 1 is a diagram of an example RFID system including an RFID reader communicating with an RFID tag in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

All of the circuits described in this document may be implemented as circuits in the traditional sense, such as with integrated circuits etc. All or some of them can also be implemented equivalently by other ways known in the art, such as by using one or more processors, Digital Signal Processing (DSP), a Field-Programmable Gate Array (FPGA), etc.

FIG. 1 is a diagram of an example RFID system including an RFID reader communicating with an RFID tag in its field of view. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
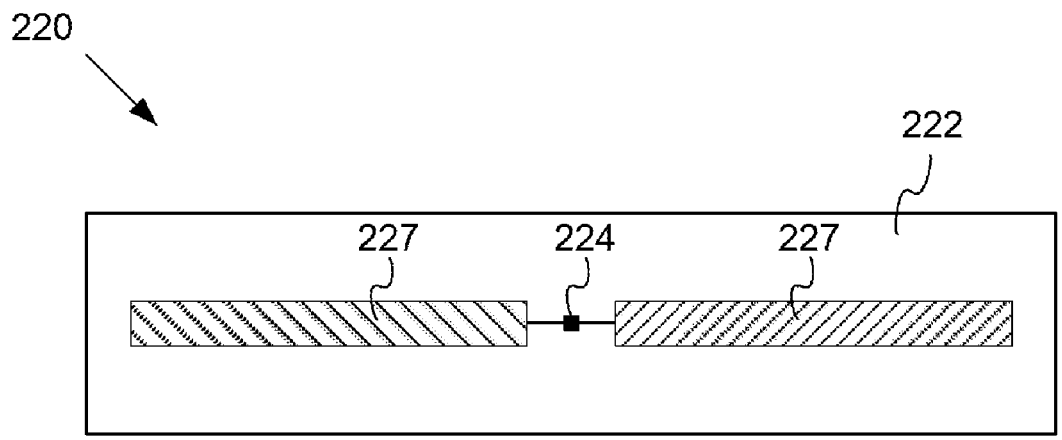
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
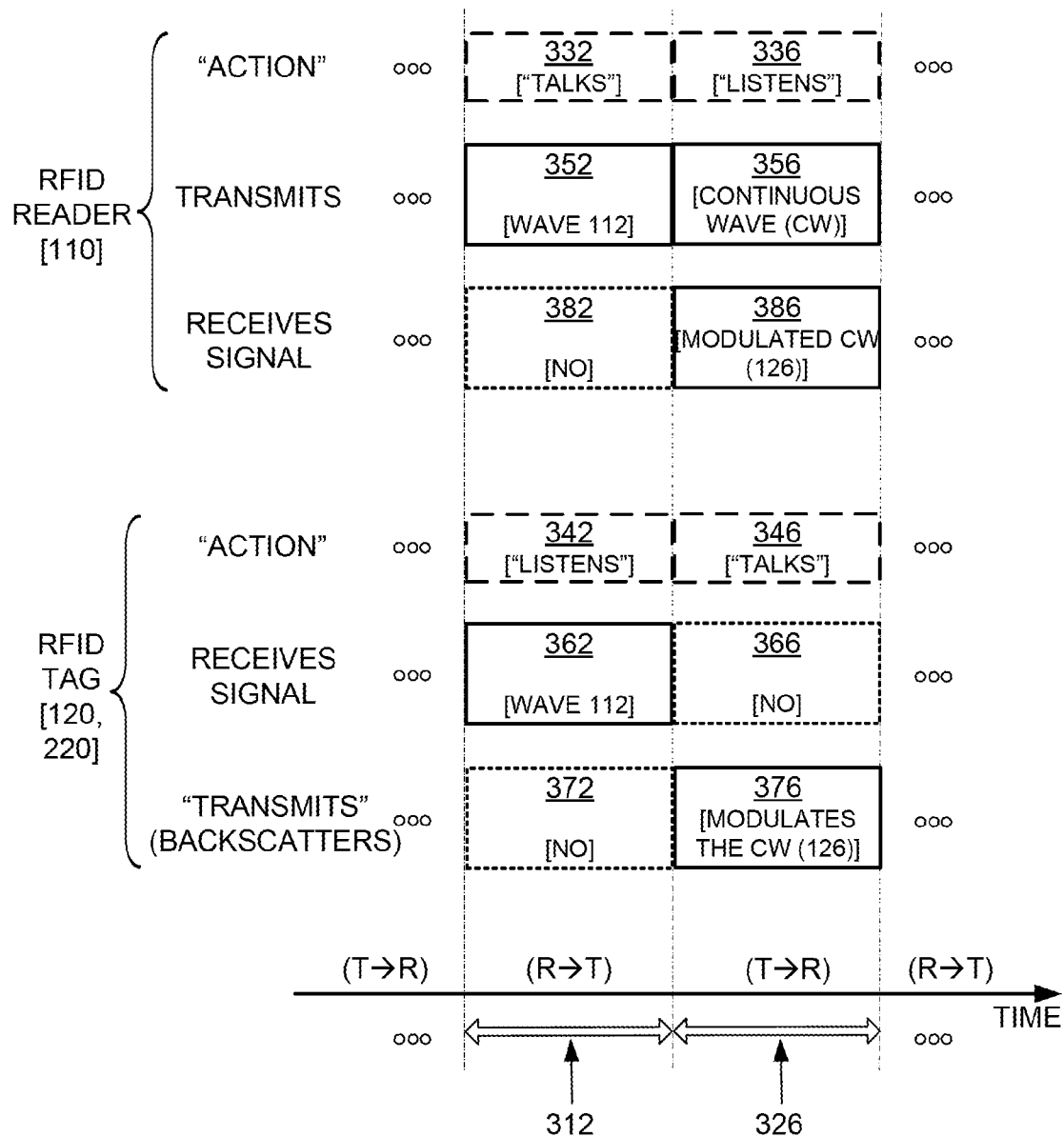
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
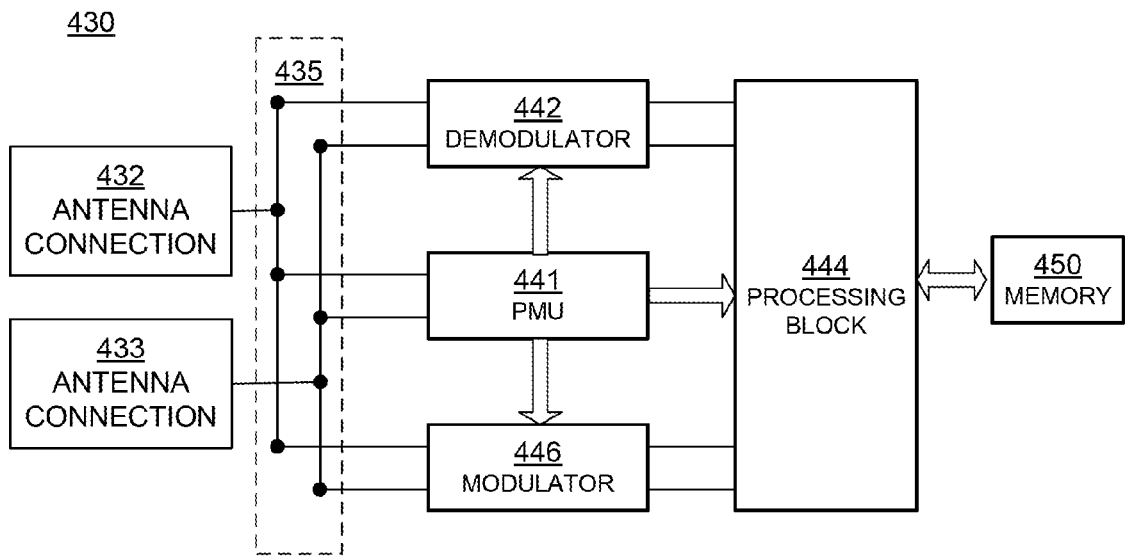
FIG. 4 is a block diagram of an implementation of an electrical circuit formed in an IC of the tag of FIG. 2.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more than two antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both R→T and T→R sessions, whether or not the received RF wave is modulated.

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 430 additionally includes a memory 450, which stores information. Memory 450 is preferably implemented as a Non Volatile Memory (NVM), which means that its stored information is retained, even when circuit 430 does not have power, as is frequently the case for a passive RFID tag.

It will be recognized at this juncture that the shown components of circuit 430 can also be those of a circuit of an RFID tag according to the invention, without needing PMU 441. Indeed, an RFID tag can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session, in treating a signal. The different operations are described below.

Figure 5A:
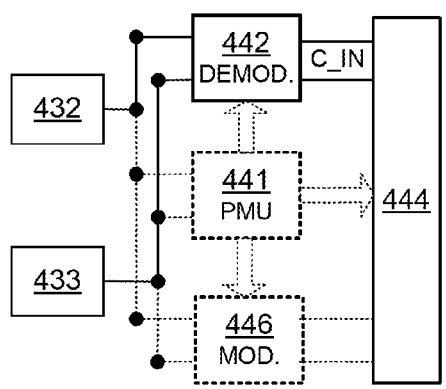
FIG. 5A is the block diagram of FIG. 4, modified to emphasize a signal operation during a R→T session of FIG. 3.

FIG. 5A shows version 530-A of components of circuit 430 of FIG. 4, further modified to emphasize a signal operation during a R→T session (receive mode of operation) during time interval 312 of FIG. 3. An RF wave is received from antenna connections 432, 433; a signal is demodulated from demodulator 442, and then input to processing block 444 as C_IN. In one embodiment according to the present invention, C_IN may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
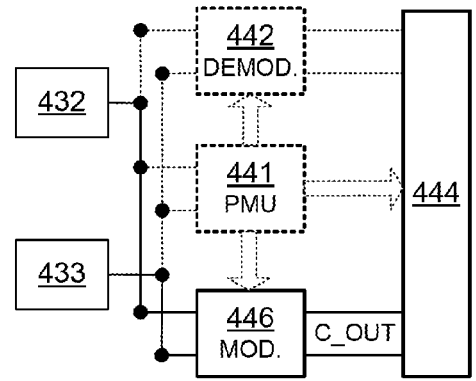
FIG. 5B is the block diagram of FIG. 4, modified to emphasize a signal operation during a T→R session of FIG. 3.

FIG. 5B shows version 530-B of components of circuit 430 of FIG. 4, further modified to emphasize a signal operation during a T→R session during time interval 326 of FIG. 3. A signal is output from processing block 444 as C_OUT. In one embodiment according to the present invention, C_OUT may include a transmission stream of symbols. C_OUT is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6A:
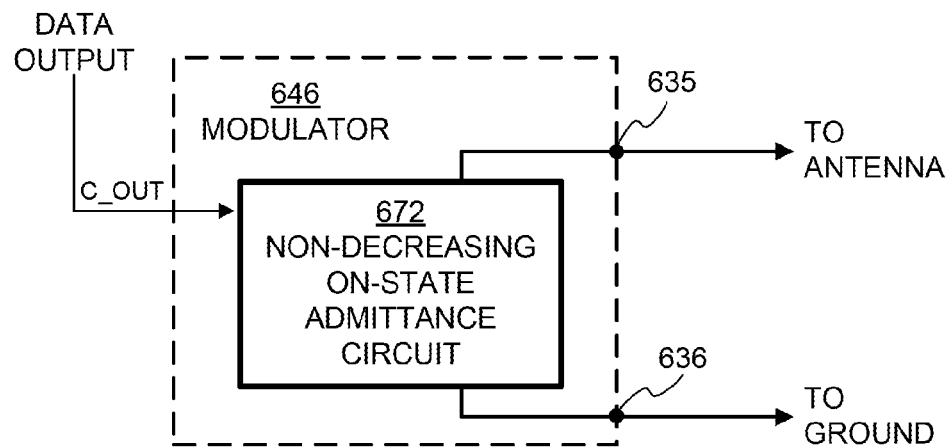
FIG. 6A illustrates a prior art RFID tag circuit modulator.

FIG. 6A illustrates a prior art RFID tag modulator 646. Modulator 646 includes an admittance circuit 672. Admittance circuit 672 controls the admittance between two nodes 635, 636, e.g. for antenna connections 432, 433. As such, nodes 635, 636 can be two antenna nodes, or an antenna and a ground, an antenna and another component such as a resistor, etc., as is known in the art.

Admittance circuit 672 typically includes a switch between nodes 635, 636, along with possibly other elements. As such, admittance circuit 672 can be made out of one or more FETs, MOS capacitors, or similar structures.

An admittance of admittance circuit 672 is varied in response to data output signal C_OUT described above. Admittance is the ratio of current flowing into a node or circuit element to the corresponding voltage across the circuit element, and is symbolized by 'Y'. Admittance is thus the reciprocal of impedance (Z), hence Y=1/Z. As with impedance, admittance is generally given as a complex number, which can be expressed in terms of a Real and an Imaginary component. The real component of admittance is also called conductance, is resistive in nature, and therefore dissipates energy ("lossy"). The imaginary component of admittance is also called susceptance, is reactive in nature, and therefore does not dissipate energy ("lossless").

Signal C_OUT thus modulates accordingly the overall reflection coefficient that the tag presents to incident wave 112, which therefore controls backscattering. In these embodiments, data output signal C_OUT typically has values corresponding to ON and OFF. These correspond to symbols, such as symbol 0, symbol 1, etc. Generally, admittance circuit 672 may have a high admittance when input data is logic 1, and low admittance when data is logic 0. The tag backscatter strength generally depends on the modulator admittance when it is in the ON-state (the "ON-state admittance" or ON admittance). More strictly speaking, the tag backscatter strength depends on the tag admittance when the modulator is in the ON-state relative to the tag admittance when the modulator is in the OFF-state (the "OFF-state admittance" or OFF admittance). Tag admittance may also depend on other tag circuits such as the PMU and demodulator, although these circuits may not be responsive to data output signal C_OUT.

Returning briefly to FIG. 1, the RF power level input in tag 120 may be different due to a variety of reasons. Such include tag 120 being oriented favorably or not, and close or not to reader 110, to name a couple. In these cases, the input RF power level may change drastically. When it does, the ON-state admittance of modulator 646 of FIG. 6A may change.

Figure 6B:
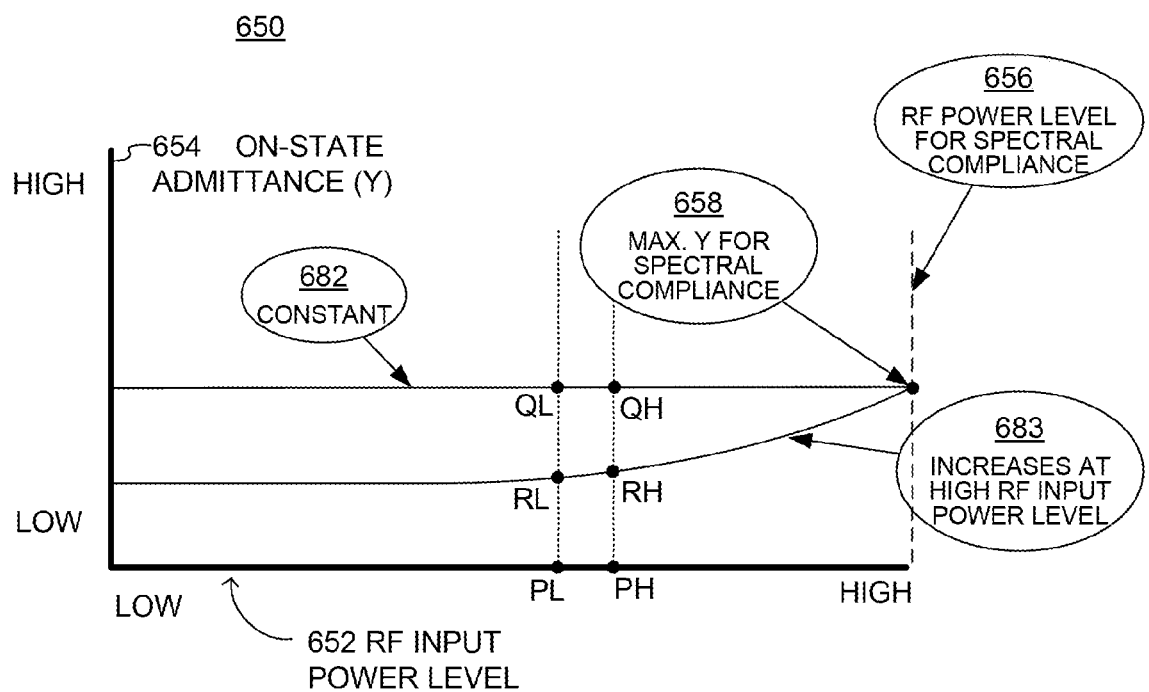
FIG. 6B is a diagram of possible values for the ON admittance value of the modulator of FIG. 6A, as the input RF power level changes.

FIG. 6B is a diagram 650 for values of the ON admittance of the modulator of FIG. 6A, as the input RF power level changes. In diagram 650, the horizontal axis represents the RF input power level 652, and the vertical axis represents the magnitude of the ON-state admittance 654. Point 658 represents the maximum high power ON-state admittance at which the tag is compliant with a spectral mask specified by a regulatory authority. Vertical dashed fine 656 represents the RF power level at which the spectral mask is specified.

In some embodiments, modulator 646 has an ON-state admittance given by graph 682, which is substantially constant, despite the different values of the RF input power level. For example, at a suitably selected lower abscissa PL the given value is QL, and at a suitably selected higher abscissa PH the given value is QH, which equals QL.

In other embodiments, modulator 646 has an ON-state admittance 683 that starts out lower than ON-state admittance 682, and slowly increases at high RF input power levels, reaching the maximum compliant admittance value of 658. This can occur inherently in modulator circuit 672, if it includes a FET switch that is driven by a rectifier voltage, which may increase at high RF input power. For example, at abscissa PL the given value is RL, and at abscissa PH the given value is RH, which is larger than RL. In other words, ON-state admittance 683 must start out lower than ON-state admittance 682, so that it can meet the condition of point 658.

As such, the ON-state admittance Y is either increasing (graph 683) or constant (graph 682), as RF input power is high and increases. Another name, therefore, for circuit 672 is non-decreasing ON-state admittance circuit.

Increasing and/or constant ON-state admittance at high RF input power is undesirable, because it corresponds to a similarly increasing and/or constant admittance difference between the admittances at the ON-state and the OFF-state. The difference is related to the amount of backscattered power strength. Such tags are constrained to use reduced backscatter strength at lower RF input powers, to comply with a spectral mask specified by a regulatory authority. The ON-state admittance of graph 682 is poor at low RF input power, and that of graph 683 is even worse, which decreases the strength of the backscattered signal.

The constraint makes it more difficult for a reader to correctly receive a backscattered signal, which in turn may result in reduced range of operation, increased vulnerability to interference, and/or other system performance degradations.

Figure 7A:
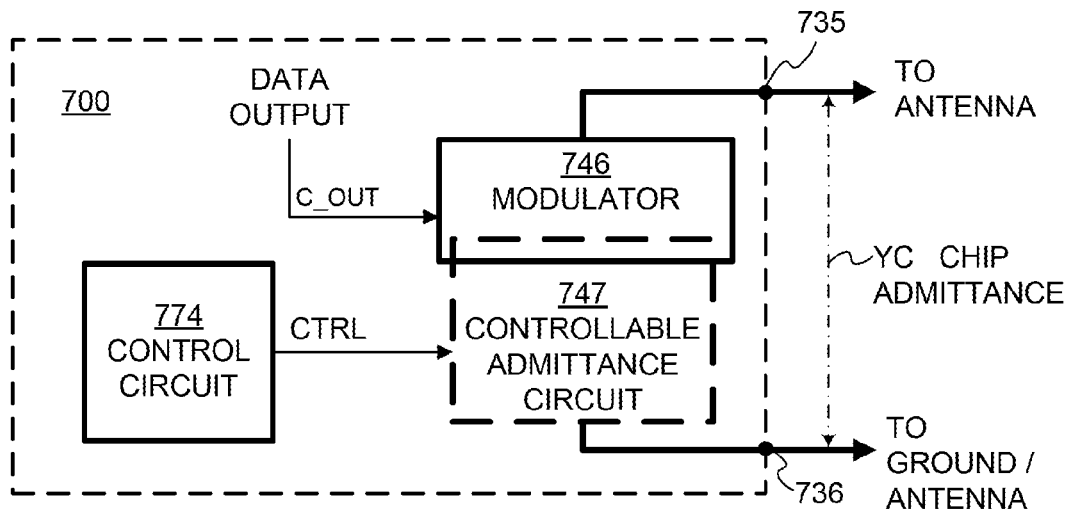
FIG. 7A is a block diagram of a portion of an RFID tag circuit according to embodiments.

FIG. 7A is a block diagram of a portion of an RFID tag circuit 700, made according to embodiments. Tag circuit 700 can be implemented in Integrated Circuit (IC) chip form, as is preferred for constructing RFID tags.

Circuit 700 includes two nodes 735, 736, similar to nodes 635, 636 described above. For example, at least one of nodes 735, 736 can be coupled to the antenna portions or segments, the other one can be coupled to a reference point that can be considered the ground, which could be or not another segment or portion of the antenna, and so on.

Nodes 735, 736 define a chip admittance YC between them. Chip admittance YC is defined in terms of a current flowing between them and an impedance to the current.

Circuit 700 further also includes a modulator 746, coupled between nodes 735, 736. Modulator 746 receives data output signal C_OUT, and is accordingly alternated between an ON-state and an OFF-state. This alternates chip admittance YC between nodes 735, 736 while the antenna is still receiving the RF wave at block 376. As such, modulator 746 backscatters the received RF wave, and imprints on it the message of data output signal C_OUT.

Chip admittance YC is alternated between an ON admittance value that is associated with the ON-state, and an OFF admittance value that is associated with the OFF state. It should be remembered that the ON admittance value and the OFF admittance value are complex numbers. An admittance difference, i.e. a difference between the ON admittance value and the OFF admittance value is related, as per the above, to the strength of the backscattered signal.

Circuit 700 further includes a control circuit 774. Circuit 774 outputs a control signal CTRL to a controllable admittance circuit 747, which will be described in more detail later in this document.

The above described admittance difference is controlled responsive to control signal CTRL, via controllable admittance circuit 747. With proper design, the admittance difference can be controlled in any number of ways. In some embodiments, for example, the ON admittance is modified. In others, the OFF admittance is modified. In yet others, both. For either the ON admittance or the OFF admittance, it can be the conductance that is modified or the susceptance, or both.

It will be appreciated that this permits the inherent behavior of the admittance difference to be shaped as desired, by suitable design of the components of circuit 700. For example, the admittance difference can be controlled so that the tag will backscatter with more power when a power level of the received RF wave is low, such as would happen when the RFID tag is farther away from the reader. This would amount to better performance. And the tag will backscatter with less power when a power level of the received RF wave is high, such as would happen when the RFID tag is close to the reader. The latter would still permit it to meet regulatory requirements.

More particularly, in a number of embodiments, the admittance difference is controlled according to a power level of the received RF wave. In these embodiments, the control signal CTRL is designed appropriately, and the admittance can take continuously changing values, or abruptly changing values, etc.

In some of these embodiments, the adaptive admittance circuit is controlled such that, for at least a range of values of the power level of the received RF wave, the admittance difference decreases as the power level increases. Again, this can be accomplished by controlling the ON admittance, the OFF admittance or both.

In a set of these embodiments, the OFF admittance is not changed. Accordingly, the admittance difference behaves as the ON admittance, which decreases as the power level increases for at least a range of its values. An example is now described.

Figure 7B:
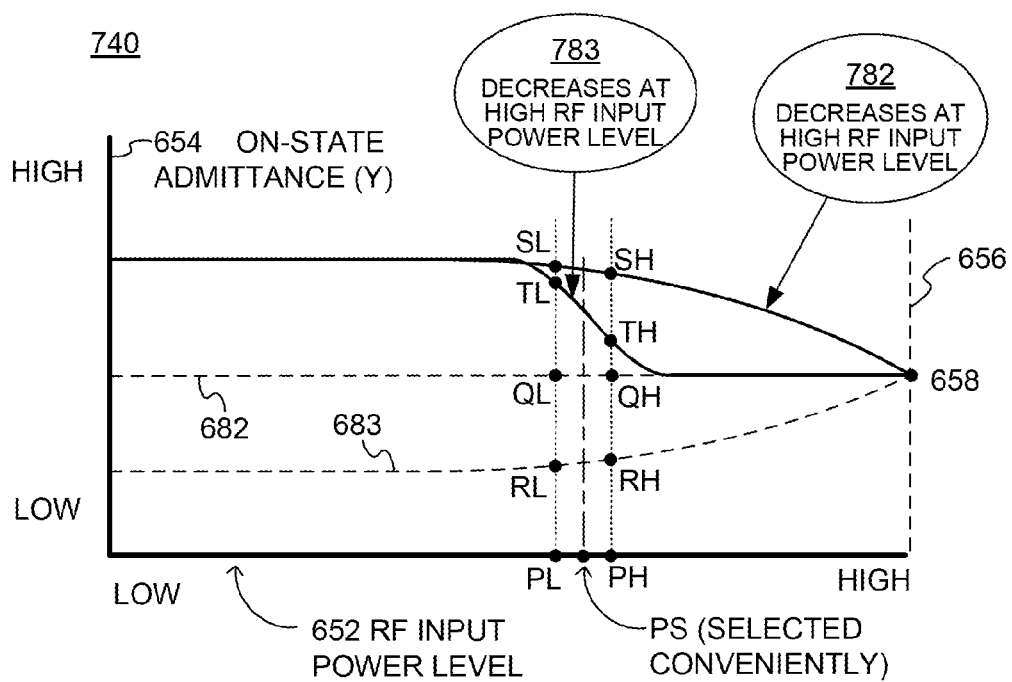
FIG. 7B is a diagram of possible values for the ON admittance of the tag circuit of FIG. 7A, as the input RF power level changes according to embodiments.

FIG. 7B is a diagram 740 of possible values of the ON admittance of modulator 746, for different values of the input RF power level. It will be recognized that diagram 740 starts with diagram 650 of FIG. 6B, and further illustrates sample graphs 782 and 783.

In both graphs 782, 783, for some range of RF input power values between PL and PH, the corresponding ON admittance values are decreasing. This is a different result than for graphs 682, 683 of the prior art.

More particularly, in graph 782, at abscissa PL the given value is SL, and at abscissa PH the given value is SH, which is smaller than SL. In graph 783, at abscissa PL the given value is TL, and at abscissa PH the given value is TH, which is again smaller than TL.

An alternate way of expressing this is with respect to a conveniently selected value. In FIG. 7B, an abscissa PS corresponds to an RF input power level that has been selected to be conveniently between PL and PH. As such, ON admittance values SL (and TL) that correspond to PL are larger than ON admittance values SH (and TH) that correspond to PH.

For both graphs 782, 783, it should be noted that, at high levels, the constraint of point 658 is respected. But at lower levels they are higher than the prior art of FIG. 6B, which yields better backscattering performance. Further, the ON admittance value decreases even faster in graph 783.

What has been described above for controlling the ON admittance could equivalently apply to controlling the OFF admittance, or both, etc., for ultimately controlling the admittance difference. This description proceeds in terms of the ON admittance only for brevity.

Returning briefly to FIG. 7A, controllable admittance circuit 747 may be implemented in any number of ways. In some of these embodiments it is a standalone circuit distinct from modulator 746, while in others it is a portion of that modulator. These embodiments are now elaborated on in more detail.

Figure 8:
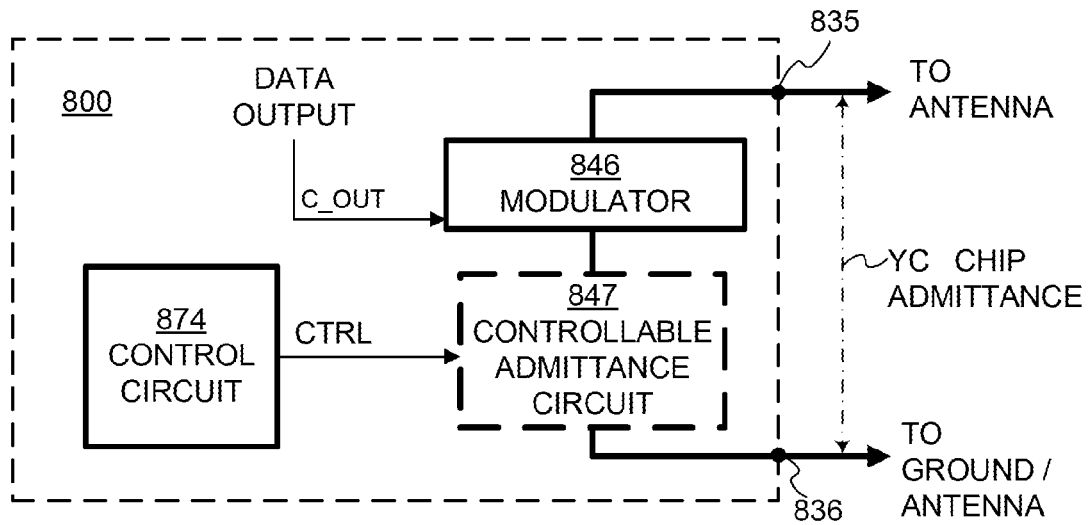
FIG. 8 is a block diagram of the portion of FIG. 7A, where the controllable admittance circuit is distinct from a modulator according to embodiments.

FIG. 8 is a block diagram of a portion of a tag circuit 800 that is similar to that of circuit 700, and where further a controllable admittance circuit 847 is distinct from a modulator 846 according to embodiments. Control signal CTRL is output by a control circuit 874, similar to control circuit 774. Control signal CTRL is received by controllable admittance circuit 847.

Controllable admittance circuit 847 is coupled between nodes 835, 836, which are similar to nodes 735, 736. In this example, controllable admittance circuit 847 is coupled in series with modulator 846, although other configurations are possible for them to be both coupled between nodes 835, 836.

In these embodiments, controllable admittance circuit 847 can be a portion of another circuit that is already provided. Such other circuit can be, for example, a rectifier for generating a rectified voltage from the received RF wave, or an Electro-Static Discharge (ESD) protection circuit of the chip. Or controllable admittance circuit 847 can be custom for that purpose, as will be appreciated from later described embodiments.

Figure 9:
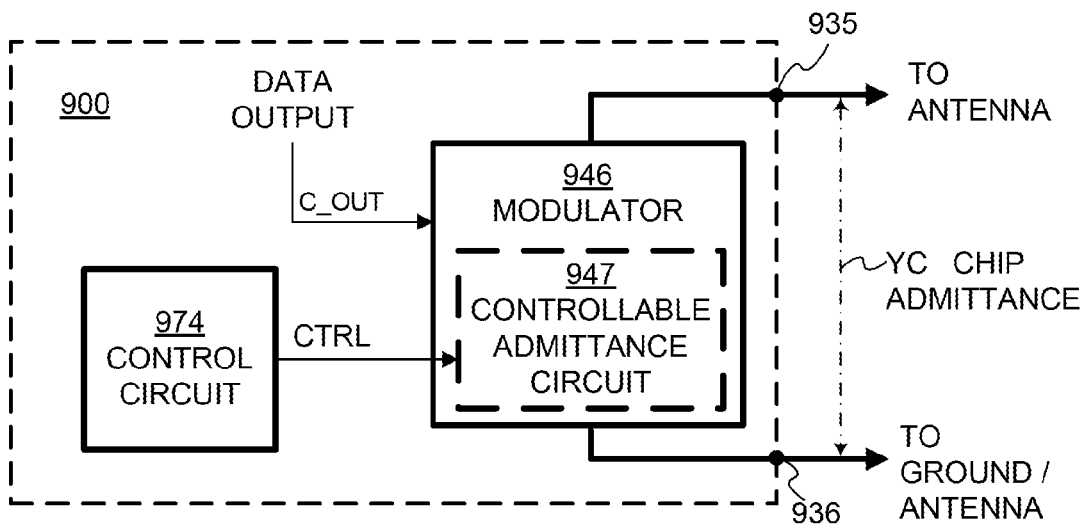
FIG. 9 is a diagram illustrating the portion of FIG. 7A, where the controllable admittance circuit is considered part of a modulator according to embodiments.

FIG. 9 is a block diagram of a portion of a tag circuit 900 that is similar to that of circuit 700, and where further a controllable admittance circuit 947 is considered to be at least part of a modulator 946 according to embodiments. Modulator 946 is coupled between nodes 935, 936, which are similar to nodes 735, 736. As such, controllable admittance circuit 947 is also coupled between nodes 935, 936. Control signal CTRL is output by a control circuit 974, similar to control circuit 774. Control signal CTRL is thus received by modulator 946. It can remain distinct from the data output signal C_OUT, or be combined with it at some point, as will be seen later in this document.

Returning briefly to FIG. 7A, control circuit 774 may be implemented in any number of ways. In some embodiments, for example, control circuit 774 can include at least a portion of a processor, such as processing block 444. In these embodiments, there is a decision made logically by the processor as to how to set the admittance, and control signal CTRL is issued accordingly. The decision can be made responsive to a received command, such as from a reader, or from the processor by interpreting a signal of a perceived ambient condition. Such an ambient condition can be the amount of power of the received RF wave.

In the preferred embodiments, control circuit 774 includes an RF power level detector circuit operable to detect a power level of the received RF wave. These preferred embodiments are now described in more detail.

FIG. 10A is a block diagram 1000 of an RFID tag circuit such that of diagram 700, where a control circuit 1074 is implemented by an RF power level detector 1075-1 according to preferred embodiments.

RF power level detector 1075-1 is operable to detect a power level of the received RF wave. For purposes of this document, an RF power level detector is any circuit arranged such that it enables detecting the RF power level. Detection can be performed in any number of ways. In some instances, detecting is by generating, in response to the RF power level, a signal with an attribute (e.g. amplitude) that can be used to infer the RF power level.

In circuit 1000, as an example only, the power level is detected from nodes 1035, 1036, which can be similar to nodes 735, 736. As such, a controllable admittance circuit 1047 can also be coupled between nodes 1035, 1036, and implemented as described for controllable admittance circuit 747.

Control signal CTRL is output by control circuit 1074, and input in controllable admittance circuit 1047. In some embodiments, RF power level detector 1075-1 outputs a signal DETP that is in response to the detected power level of the received RF wave. In addition, control circuit 1074 further includes a convert circuit 1079 that outputs control signal CTRL in response to signal DETP.

Control signal CTRL can be shaped as desired by convert circuit 1079. Accordingly, by way of example and not of limitation, control signal CTRL may be an analog signal whose level varies based on the power level of the received RF wave, or a signal whose frequency varies based on that power level. Alternately, the control signal may vary based on a peak of the received RF wave or have a value based on a logarithm of that power level.

RF power level detector 1075-1 may be implemented in any number of ways. As one example, it can be made by taking advantage of at least a portion of demodulator 442 of FIG. 5B, which is not being otherwise used during that time period 326 of FIG. 3. Demodulator 442 could have an envelope detector that is already coupled with nodes 1035, 1036. Two more examples are now described.

FIG. 10B is a schematic diagram of a detector 1075-2, which can be used for RF power level detector 1075-1. Diode RF power detector 1075-2 includes a first diode D1, and a first filtering capacitor C1 that are coupled to each other. The designations "ANTENNA INPUT" and ground can be nodes 1035, 1036.

FIG. 10C is a schematic diagram of another detector 1075-3, which can be used for RF power level detector 1075-1. It will be recognized that detector 1075-3 has the same features as detector 1075-2, plus diode D1 is coupled to the "ANTENNA INPUT" node through a second capacitor C2. Moreover, between the ground node and a node between D1 and C2 there can be another diode D2. By passing the incident RF signal through C2 (controlled by D2) and then through the peak detection stage comprising D1 and C1, the generated control signal CTRL may be set at a level desired for the tag circuit design.

Figure 11A:
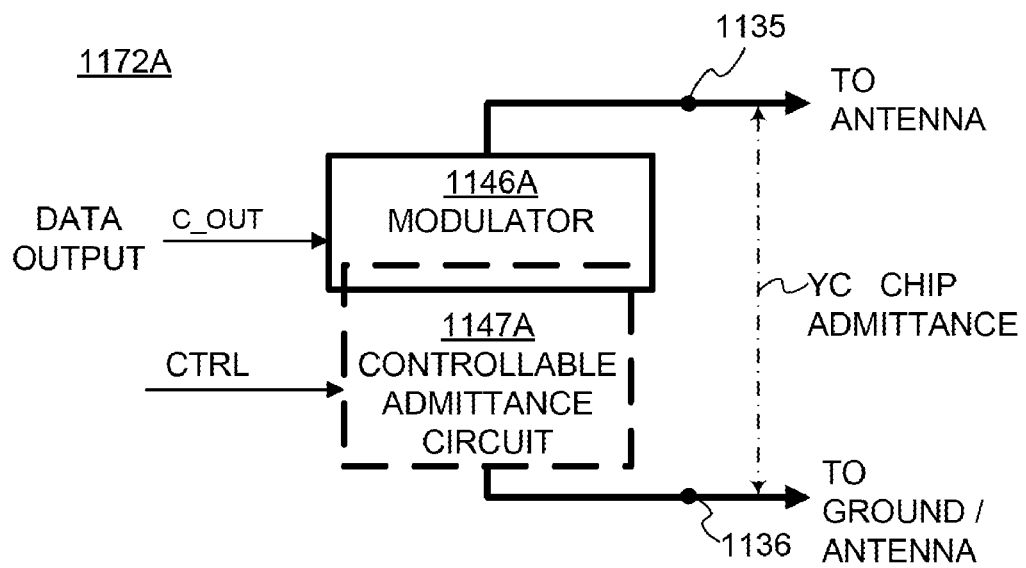
FIG. 11A is a block diagram of a portion of the diagram of FIG. 7A for discussing individual components contributing to impedance.

FIG. 11A is a block diagram 1172A of a portion of the diagram 700 of FIG. 7A. Diagram 1172A is used for discussing in more detail the components that contribute to chip admittance YC between two nodes 1135, 1136 similar to nodes 735, 736. Diagram 1172A shows a controllable admittance circuit 1147A similar to controllable admittance circuit 747, and a modulator 1146A similar to modulator 746. It will be recognized in the embodiments below that controllable admittance circuit 1147A and modulator 1146A are either distinct as in FIG. 8, or joined as in FIG. 9.

In a number of embodiments, a controllable admittance circuit is provided that is distinct from the modulator, and includes at least one Field Effect Transistor (FET), which is coupled in series with the modulator between nodes 1135, 1136. In those, a gate of the FET receives and is controlled by the control signal. An example is now described.

Figure 11B:
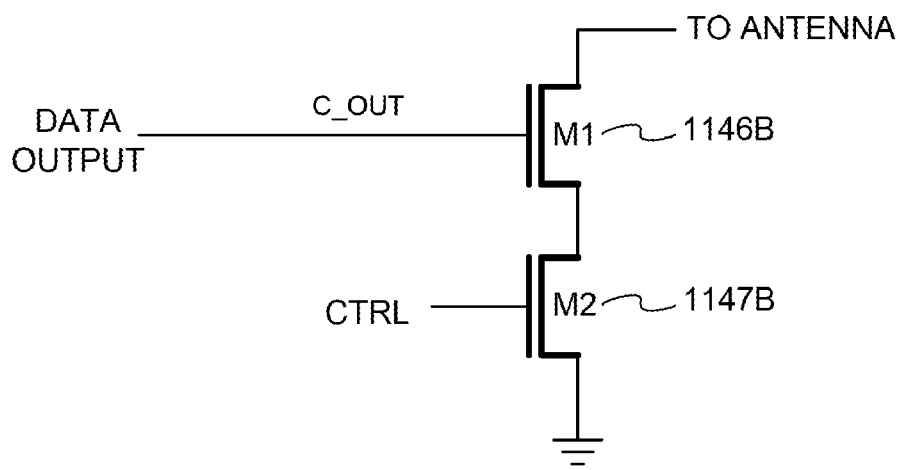
FIG. 11B is a schematic diagram of components that can be used in the block diagram of FIG. 11A according to an embodiment.

FIG. 11B is a schematic diagram 1172B of components that can be used in the block diagram of FIG. 11A according to an embodiment. Circuit 1172B is an example of a circuit that focuses on the resistive part of the admittance, which is the conductance.

In circuit 1172B, the modulator is a first FET M1 1146B. It has a first FET M1 has a first terminal coupled to node 1135 (seen in FIG. 11A), a gate terminal arranged to receive data output signal C_OUT, and a second terminal. In addition, the controllable admittance circuit includes a second FET M2 1147B. FET M2 1147B has a first terminal coupled to the second terminal of FET M1 1146B, a gate terminal arranged to receive and be controlled by control signal CTRL, and a second terminal coupled to node 1136 (seen in FIG. 11A).

The chip conductance YC is determined by transistors M1 and M2, which is part of the current path between nodes 1135, 1136. M1 is arranged to modulate conductance in response to data output signal C_OUT, while M2 varies the conductance is response to control signal CTRL.

As already mentioned above, in a number of embodiments, control signal CTRL can vary responsively to the RF power level. In some of these embodiments, as already mentioned with reference to FIG. 10A, the control circuit includes an RF power level detector circuit to detect a power level of the received RF wave, and output a corresponding signal DETP. In addition the control circuit includes a convert circuit that outputs control signal CTRL in response to the detected power level of the received RF wave, for example as sensed by signal DETP. An example is now described.

FIG. 11C is a schematic diagram 1172C of components that can be used in the block diagram of FIG. 11A. In circuit 1172C, the modulator is a first FET M1 1146C similar to 1146B, and the controllable admittance circuit includes a second FET M2 1147C similar to 1147B, coupled similarly between the nodes.

A convert circuit 1179C receives signal DETP and outputs control signal CTRL. As such, M2 1147C varies the conductance is response to signal DETP.

In this particular case, convert circuit 1179C includes two FETs M3 and M4. M3 and M4 each have a source coupled to the gate of FET 1147C, where a bias current Ibias may also be advantageously received. M3 and M4 each have a drain coupled to a drain of FET 1147C and to an antenna/ground node that corresponds to node 1136 of FIG. 11A. FET M3 receives the detected power signal DETP at its gate.

In the above, M1 and M2 may be implemented as strong FETs, while M3 and M4 may be implemented as weak FETs. A strong FET has a higher ON-state conductance than a weak FET. Plus, source terminals can be interchanged with drain terminals using appropriate design, and so on.

As such, M1 is arranged to modulate chip conductance YC in response to data output signal C_OUT, while M2 adapts the overall chip conductance YC in response to signal DETP. At low RF power, the voltage of DETP is below the threshold of M4. Consequently M4 is off, and M2 is turned strongly on by bias current Ibias. At high RF power, the voltage of DETP is above the threshold of M4. Consequently M4 is on, and the conductance of M2 is reduced because bias current shunting by M4 reduces the gate voltage of M2.

In some of these embodiments, the controllable admittance circuit further includes at least a second FET that is coupled in parallel with the above mentioned first FET. This means that their drains are coupled together, and their sources are coupled together. They can be advantageously receiving different signals at their gates. An example is now described.

FIG. 11D is a schematic diagram 1172D of components that can be used in the block diagram of FIG. 11A. In diagram 1172D, components are shown that are similarly numbered as respective components in diagram 1172C. In addition, controllable admittance circuit 1147D further includes at least a second FET M5 that is coupled in parallel with FET M2.

M5 is intended to provide a minimum conductance floor at high RF power, even if M2 is completely turned off. As such, a gate of M5 can receive a bias voltage.

Different examples are now described, of circuits that focus on the reactive part of chip admittance YC, which is the susceptance. These will be identified more easily since a capacitor is also included between the nodes.

It will be further recognized that these are embodiments where the controllable admittance circuit and the modulator are joined, as in FIG. 9. In these cases the modulator itself receives control signal CTRL and varies the tag admittance accordingly, in addition modulating in response to data output signal C_OUT. This is not necessary for the capacitor embodiments, however, and the resistor embodiments are not precluded from using a controllable admittance circuit that is joined with the modulator.

Figure 11E:
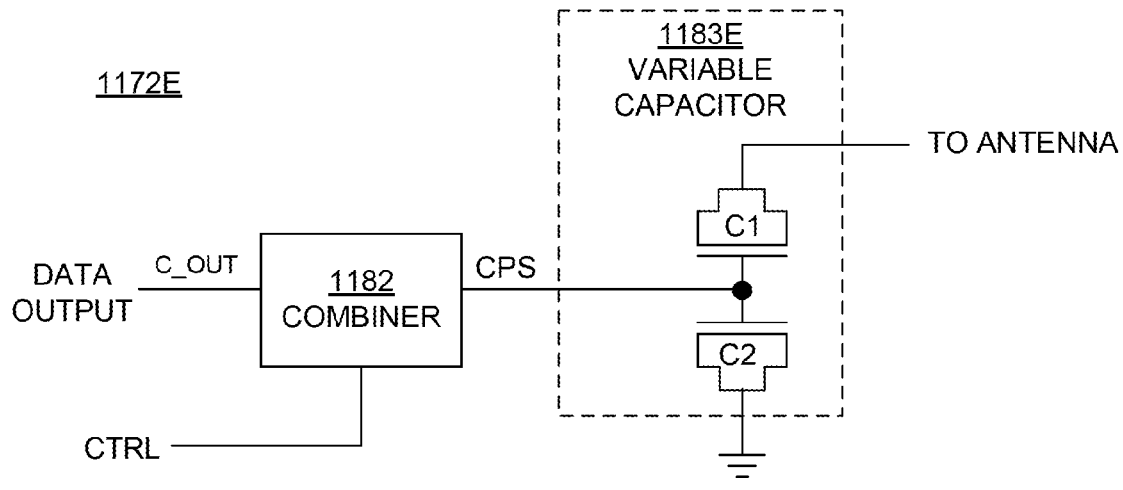
FIG. 11E is a schematic diagram of components that can be used in the block diagram of FIG. 11A according to an embodiment.

FIG. 11E is a schematic diagram 1172E of components that can be used in the block diagram of FIG. 11A. These components form a modulator, which includes a combiner circuit 1182 and a variable capacitor 1183E.

Combiner circuit 1182 receives data output signal C_OUT and control signal CTLR, combines them, and accordingly outputs a first capacitance control signal CPS. The capacitance of variable capacitor 1183E, and thus also the ON admittance, are adapted responsive to first capacitance control signal CPS. Combiner 1182 preferably further influences the excursion limits of the susceptance and protect it from extreme values of control signal CTRL, in case the DETP signal is used instead of the CTRL signal.

Variable capacitor 1183E may be made in a number of ways. Circuit 1172E also shows the preferred embodiment for variable capacitor 1183E. This is made from a first capacitor C1 and a second capacitor C2, which can be made from MOSFET or MESFET technology. Capacitors C1 and C2 each have two terminals. One of their terminals receives signal CPS, while the other is coupled to the node. In some embodiments, signal CPS could be charging one or more floating gates.

There are also other embodiments for modifying the capacitance of variable capacitor 1183E. An example is now described.

Figure 11F:
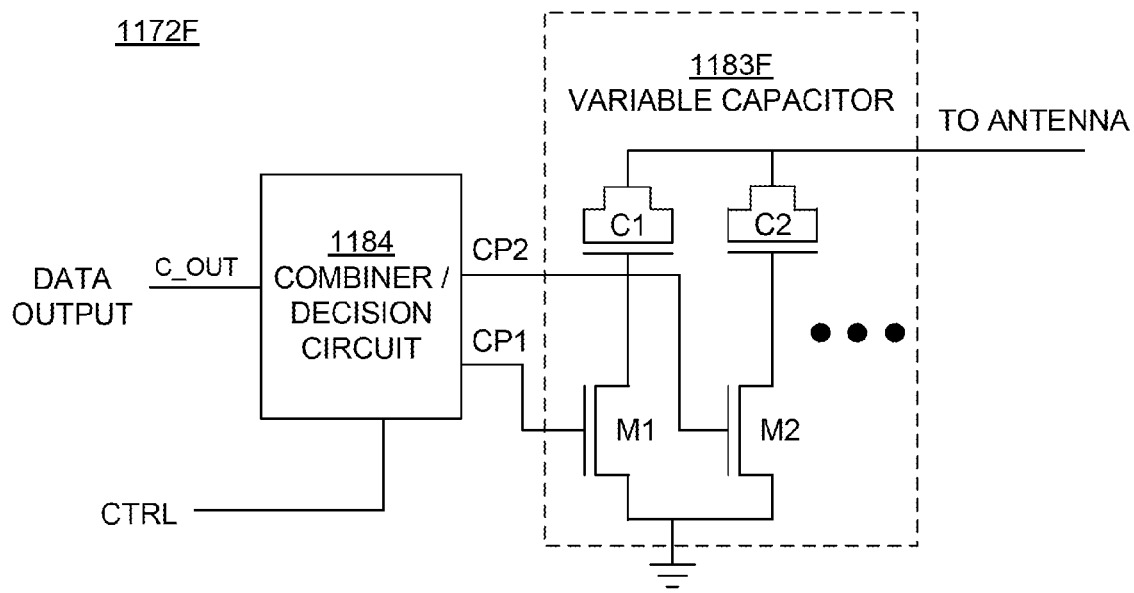
FIG. 11F is a schematic diagram of components that can be used in the block diagram of FIG. 11A according to an embodiment.

FIG. 11F is a schematic diagram 1172F of components that can be used in the block diagram of FIG. 11A. Combiner/decision circuit 1184 receives data output signal C_OUT and control signal CTLR, combines them, and accordingly outputs a first capacitance control signal CP1 and a second capacitance control signal CP2.

Variable capacitor 1183F capacitor includes a first capacitor C1 and a first switch FET M1 coupled in series between the two nodes, and a second capacitor C2 and a second switch FET M2 coupled in series between the two nodes. M1 and M2 are controlled differently from the combiner circuit, here by individual capacitance control signals CP1 and CP2 respectively. Combiner 1184 is also known as a decision circuit because in certain instances it may be decided to use one of the capacitance control signals CP1, CP2 to turn off one of the capacitors.

Capacitors C1, C2, and additional ones may be selected with similar or varying capacitances. The capacitances may be selected according to a predetermined pattern such as binary weighting for improved granularity in adapting the admittance.

Adaptable admittance circuit 1172F also modulates a susceptance of the modulator by varying the amount of capacitance. The total capacitance of adaptable admittance circuit 1172F is controlled by a number and capacitance of capacitors (C1, C2, and so on) switched into active operation. Decision circuit 1184 influences gate signals of switching FETs (M1, M2, and so on) based on data output C_OUT and control signal CTRL. In response, the FETs (M1, M2, and so on) switch capacitors on or off.

Figure 12:
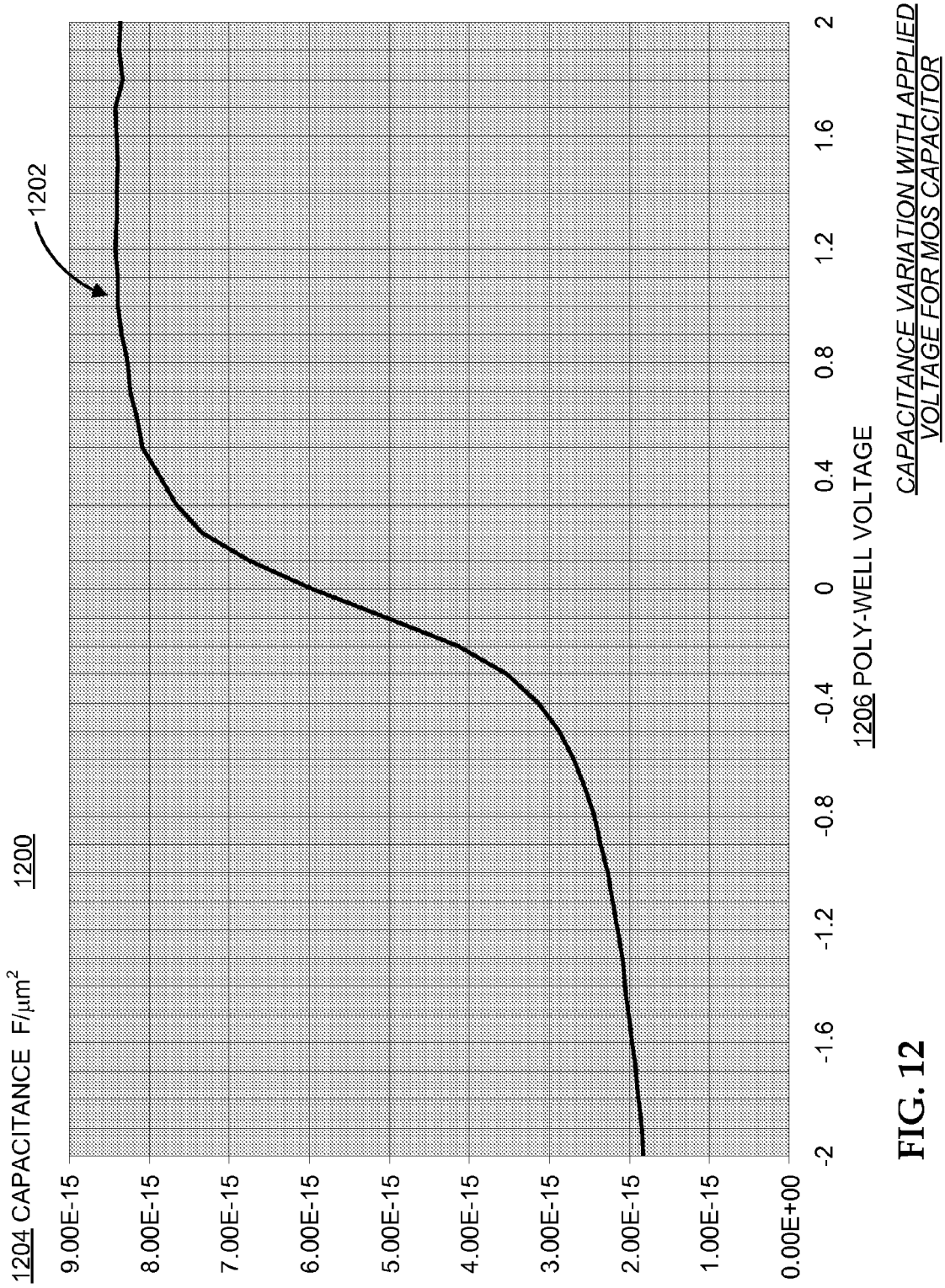
FIG. 12 is a diagram of the variation of the capacitance of a MOS capacitor that may be used in an adaptive admittance circuit such as the circuits of FIGS. 11E and 11F.

FIG. 12 is a diagram of the variation of the capacitance of a MOS capacitor that may be used in an adaptive admittance circuit, such as the circuits of FIGS. 11E and 11F.

As diagram 1200 shows, capacitance of a MOS capacitor may change slowly as poly-well voltage 1206 increases, until a rapid rise region is reached. In the rapid rise region, capacitance 1204 increases almost linearly in proportion to the poly-well voltage. Then, the capacitance curve 1202 reaches a saturation region, where the capacitance remains substantially constant with the increasing poly-well voltage.

These characteristics of a MOS capacitor may be used as described in FIG. 11E and FIG. 11F for adaptively varying the susceptance of the admittance circuit, thereby adjusting the admittance of the tag modulator.

Figure 13A:
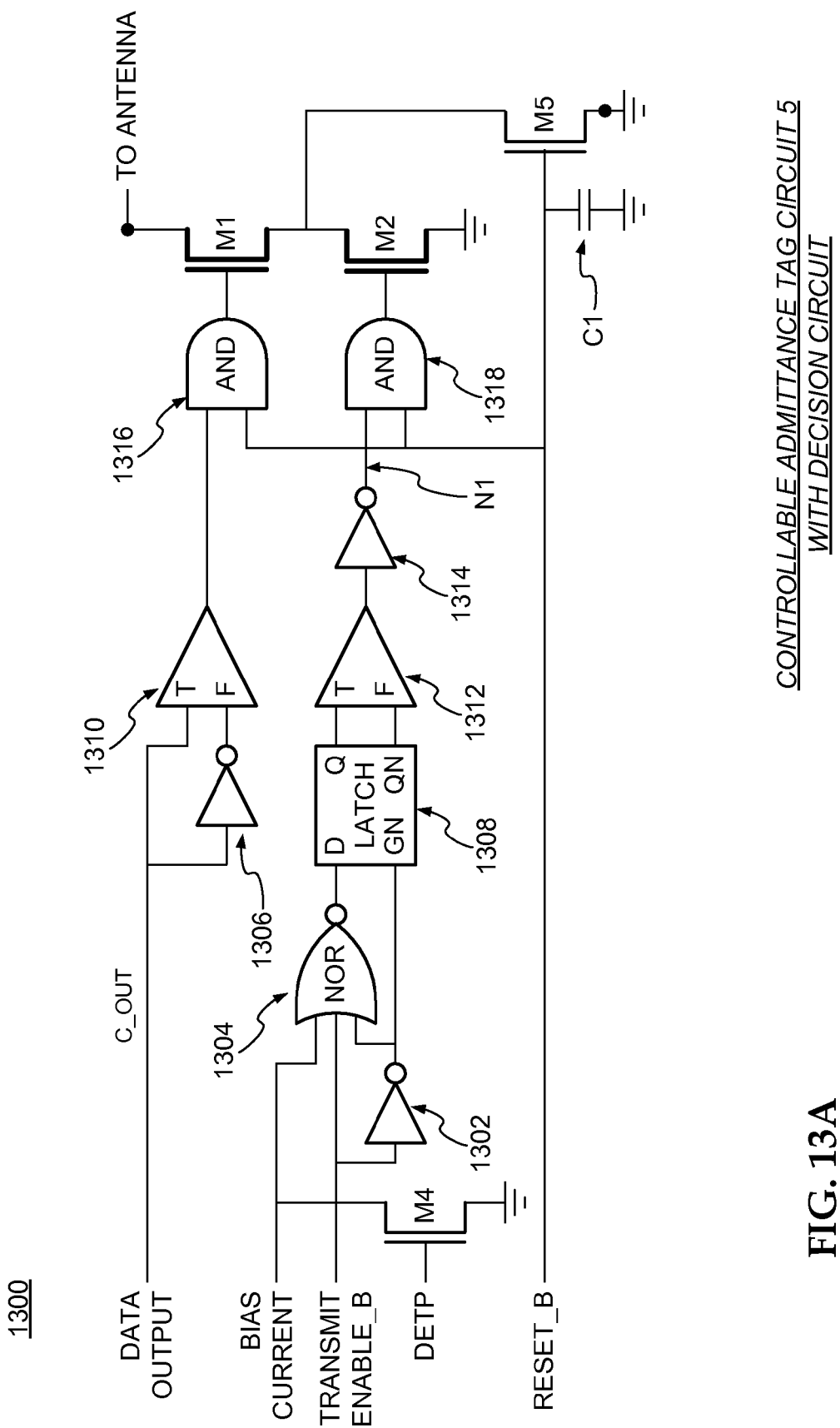
FIG. 13A is a schematic diagram of a controllable admittance circuit and a decision circuit for use in an adaptive modulator according to embodiments.

FIG. 13A is a schematic diagram 1300 of an adaptable admittance circuit and a decision circuit for use in an adaptive modulator according to embodiments.

In the adaptable admittance circuit strong FETs M1, M2, and weak FET M5 are used to modulate the admittance (conductance) of the tag modulator, similar to the circuits discussed in FIG. 11C and FIG. 11D.

The decision circuit comprises several components. For example, data output C_OUT is provided directly and through inverter 1306 to level shifter 1310. An output of level shifter 1310 along with a reset signal RESET_B is provided through AND gate 1316 to M1, for controlling a conductance of that transistor.

RESET_B is also provided to M5 for turning that transistor on and off, as described below in conjunction with FIG. 13B.

Strong transistor M2 is controlled by an output of AND gate 1318, which operates on RESET_B and a signal based on a combination of bias current, RF input power level, and a TRANSMIT ENABLE_B signal. RF input power level, represented by signal DETP, is used to turn on and off M4 pulling down the bias current. The drain voltage of M4, as influenced by the RF input power level, is provided to a NOR gate 1304 along with a delayed inverted (through slow inverter 1302) and non-inverted version of the TRANSMIT ENABLE_B signal.

Outputs of inverter 1302 and NOR gate 1304 are provided to latch circuit 1308, whose Q and QN outputs are provided to level shifter 1312. The output of level shifter 1312 is inverted through inverter 1314 and provided to AND gate 1318 along with RESET_B for controlling M2.

Figure 13B:
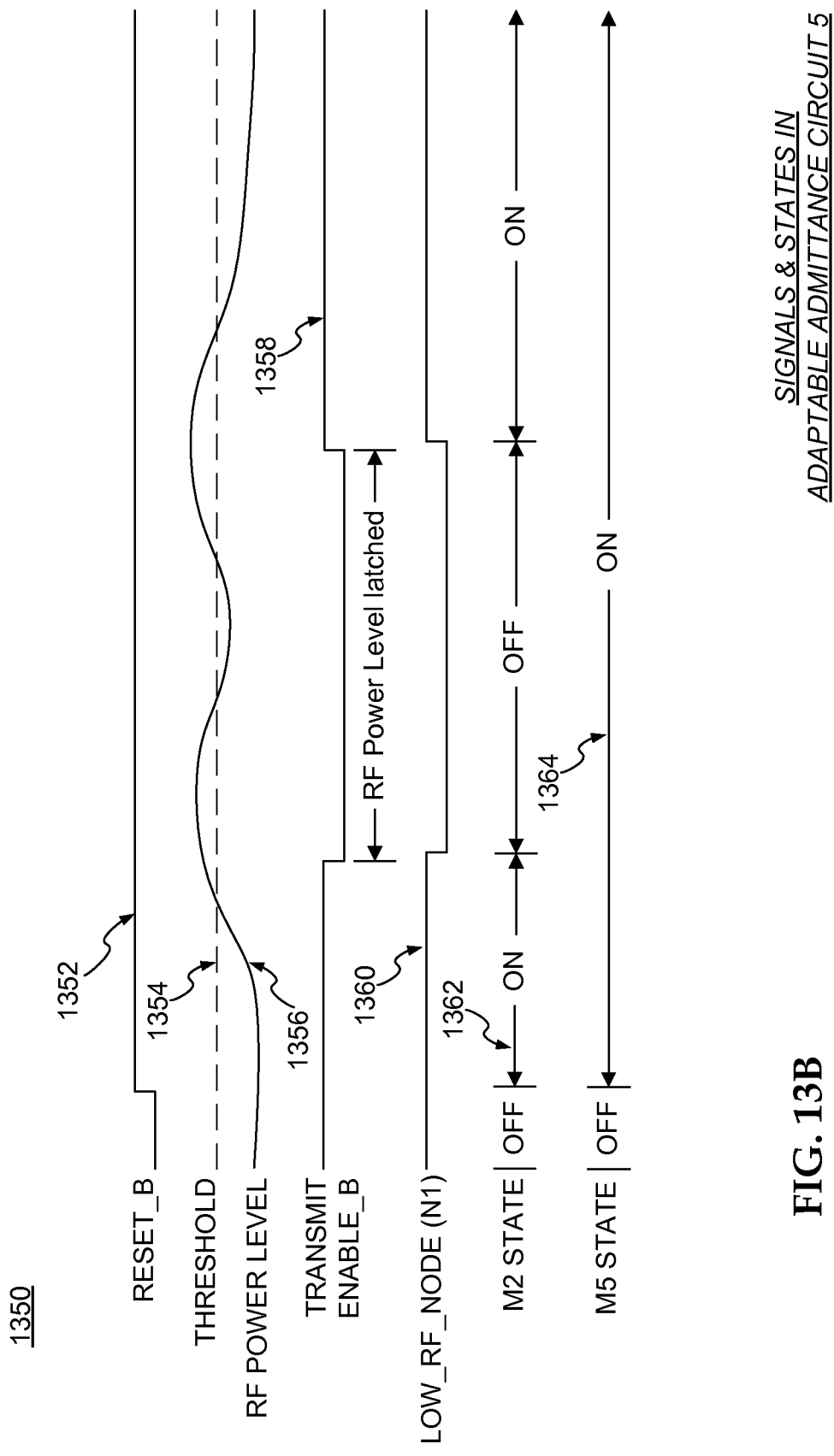
FIG. 13B illustrates various waveforms and transistor states found in the adaptable admittance and decision circuit of FIG. 13A.

FIG. 13B illustrates various waveforms and transistor states found in the adaptable admittance and decision circuit of FIG. 13A.

As shown in diagram 1350, when RESET_B (1352) is switched to a high value, M2 and M5 transition from an OFF-state to an ON-state (1362 and 1364).

The RF input power level (1356) can vary throughout the communication and is compared to a threshold 1354. When the RF input power level exceeds threshold 1354 and is latched by latch circuit 1308, an input of AND gate 1318 at node N1 goes low, effectively turning off M2, thereby limiting a backscattered power at high RF input power levels. When the TRANSMIT ENABLE_B signal (1358) switches to a low value, the RF input power level is latched by the latch circuit 1308 in diagram 1300. The output of latch circuit 1308 remains fixed while the TRANSMIT ENABLE_B input is low. Thus the backscatter strength of each tag transmission is set at the beginning of the transmission and is not permitted to change during the transmission.

The invention also includes methods. These methods can be implemented in any number of ways, including by the structures described in this document. Such methods are now described more particularly according to embodiments.

Figure 14:
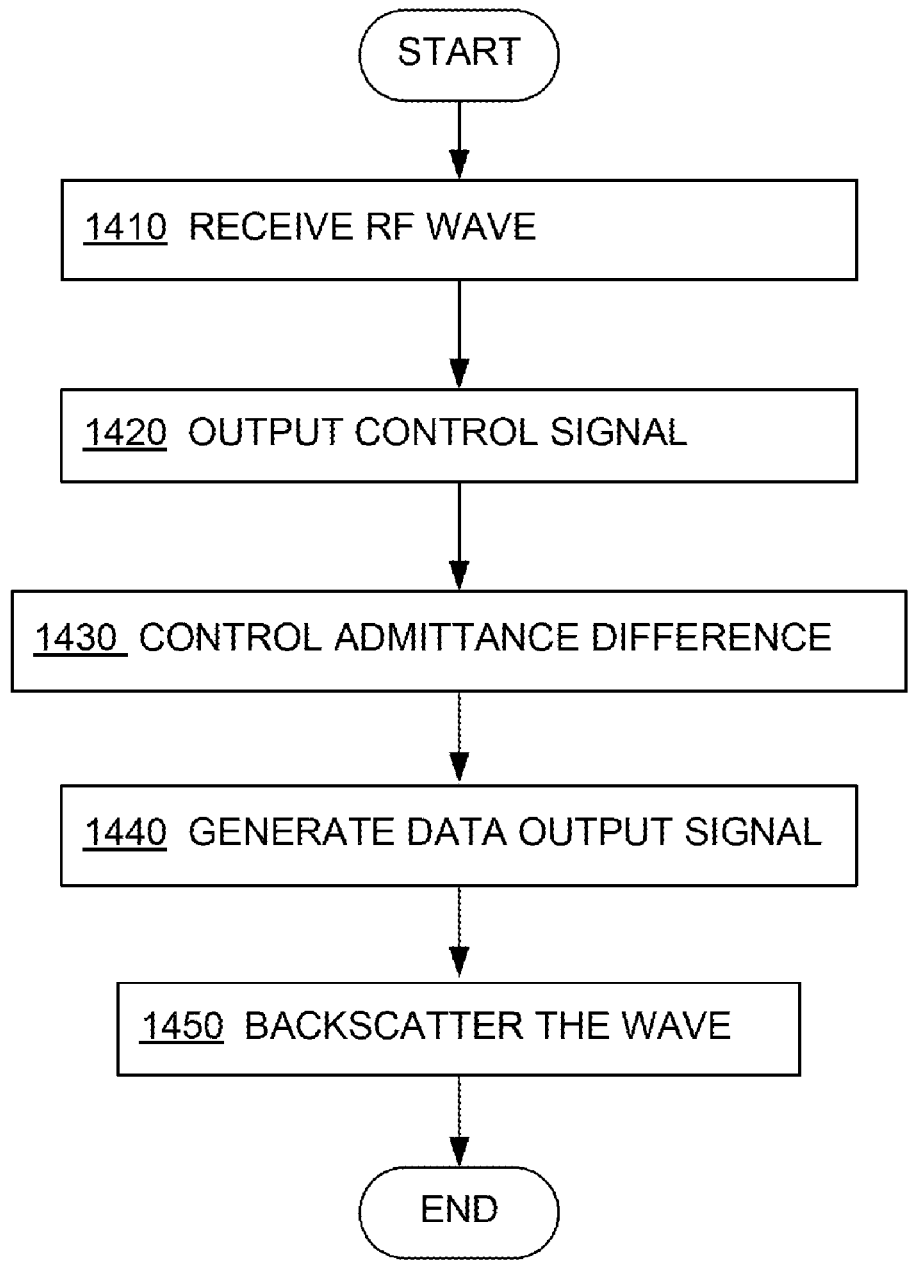
FIG. 14 is a flowchart of a process for adapting the ON admittance value of an RFID tag modulator circuit based on received RF power levels according to embodiments.

FIG. 14 is a flowchart of a process 1400. Process or method 1400 is for a Radio Frequency Identification (RFID) tag circuit, which has two nodes that define a chip admittance between them.

Process 1400 begins at operation 1410, where an RF wave is received by the tag. The RF wave may include a signal transmitted by a reader, or be continuous wave, or both, as per the above.

According to another operation 1420, a control signal is output. This may be performed in any number of ways, for example in the ways described above. In some embodiments, a power level of the received wave is detected, and the control signal is output responsive to the detected power level.

According to another operation 1430, an admittance difference is controlled responsive to the control signal of operation 1420. The admittance difference is controlled by controlling one or both of an ON admittance value of the chip admittance that is associated with an ON-state, and an OFF admittance value of the chip admittance that is associated with an OFF-state.

According to another operation 1440, a data output signal is generated in response to the received RF wave.

According to one more operation 1450, the received RF wave is backscattered by the tag, by alternating the chip admittance responsive to the data output signal, between the ON admittance value and the OFF admittance value.

The operations included in process 1400 are for illustration purposes. Adaptable modulator admittance in an RFID tag may be implemented by similar processes with fewer or additional steps, as well as in different order of operations using the principles described herein.

The electrical circuit(s) described in this document can be manufactured in any number of ways, as will be appreciated by the persons skilled in the art. One such way is as integrated circuit(s), as described below.

Schematic-type inputs can be provided for the purpose of preparing one or more layouts. These inputs can include as little as a schematic of a circuit, to more including relative sizes of circuit components and the like, as will be appreciated by a person skilled in the art for such inputs. These inputs can be provided in any suitable way, such as merely in writing, or electronically, as computer files and the like. Some of these computer files can be prepared with the assistance of suitable design tools, often provided as computer software. Such tools often include instrumentalities for simulating circuit behaviors and the like.

These inputs can be provided to a person skilled in the art of preparing layouts. This, whether the person is within the same company, or another company, such as under a contract.

A layout can be prepared that embodies the provided schematic-type inputs by the person skilled in the art. The layout is itself preferably prepared as a computer file. It may be additionally checked for errors, modified as needed, and so on.

In the above, computer files can be made from portions of computer files. For example, suitable individual designs can be assembled for the electrical components and circuits indicated in the schematic-type inputs. The individual designs can be generated anew, or selected from existing libraries for such items. In the layout phase, the assembled designs can be arranged to interoperate, so as to implement as integrated circuit(s) the electrical circuit(s) of the provided schematic-type inputs. These computer files can be stored in storage media, such as memories, whether portable or not, and the like.

Then a special type of computer file can be synthesized from the prepared layout, in a manner that incorporates the prepared layout that has the embodied schematic-type inputs. Such files are known in the industry as IC chip design files or tapeout files, and express instructions for machinery as to how to process a semiconductor wafer, so as to generate an integrated circuit that is arranged as in the incorporated layout. These IC chip design files or tapeout files can be stored on an article such as a memory device.

The synthesized tapeout file is then transferred to a semiconductor manufacturing plant, which is also known as a foundry, and so on. Transferring can be by any suitable means, such as over an electronic network. Or a tapeout file can be recorded in a storage medium, which in turn is physically shipped to the mask manufacturer.

The received tapeout file is then used by mask making machinery as instructions for processing a semiconductor wafer. The wafer, as thus processed, now has one or more integrated circuits, each made according to the layout incorporated in the tapeout file. If more than one, then the wafer can be diced to separate them, and so on.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A Radio Frequency Identification (RFID) Integrated Circuit (IC) chip for use with an RFID tag that has an antenna for receiving an RF wave, the IC chip comprising:
   two nodes defining a chip admittance between them, at least one of the nodes for coupling to the antenna;
   a control circuit for outputting a control signal;
   a processor for generating a data output signal in response to the received RF wave;

a modulator operable to backscatter the received RF wave by alternating the chip admittance responsive to the data output signal between an ON admittance value of the chip admittance that is associated with an ON-state and an OFF admittance value of the chip admittance that is associated with an OFF-state, in which an admittance difference between the ON admittance value and the OFF admittance value is controlled responsive to the control signal; and a controllable admittance circuit distinct from the modulator, coupled between the two nodes, in which the control signal is received by the controllable admittance circuit.

2. The IC chip of claim 1, in which
the admittance difference is controlled by modifying at least one of the ON admittance and the OFF admittance.

3. The IC chip of claim 1, in which
the ON admittance is adapted to have a first value if a power level of the received RF wave is less than a selected value, and a second value less than the first value if the power level is higher than the selected value.

4. The IC chip of claim 1, in which
the controllable admittance circuit is a portion of one of a rectifier for generating a rectified voltage from the received RF wave and an Electro-Static Discharge (ESD) protection circuit of the chip.

5. The IC chip of claim 1, in which
the control signal is also received by the modulator.

6. The IC chip of claim 1, in which
the control circuit includes at least a portion of the processor.

7. The IC chip of claim 1, in which
the control circuit includes an RF power level detector circuit operable to detect a power level of the received RF wave.

8. The IC chip of claim 7, further comprising:
a demodulator for demodulating the received RF wave, and
in which the RF power level detector circuit includes at least a portion of the demodulator.

9. The IC chip of claim 7, in which
the control signal is one of: an analog signal whose level varies based on the power level of the received RF wave, a signal whose frequency varies based on the power level of the received RF wave, a signal based on a peak of the received RF wave, and a signal whose value is based on a logarithm of the power level of the received RF wave.

10. The IC chip of claim 7, in which
the RF power level detector circuit includes a first diode and a first capacitor coupled to each other, the first diode further coupled to one of the nodes, and the first capacitor further coupled to the other one of the nodes.

11. The IC chip of claim 10, in which
the first diode is coupled to one of the nodes through a second capacitor.

12. The IC chip of claim 1, in which:
the controllable admittance circuit includes at least a first FET that is coupled in series with the modulator between the two nodes, and
in which a gate of the first FET receives and is controlled by the control signal.

13. The IC chip of claim 12, in which
the control circuit includes
an RF power level detector circuit operable to detect a power level of the received RF wave, and
a convert circuit that outputs the control signal in response to the detected power level of the received RF wave.

14. The IC chip of claim 13, in which
the power level detector circuit outputs a detected power signal,
the convert circuit includes two FETs, each with a source coupled to the gate of the first FET, each with a drain coupled to a drain of the first FET and to one of the nodes, and one of which receives the detected power signal at a gate.

15. The IC chip of claim 12, in which
the controllable admittance circuit further includes at least a second FET that is coupled in parallel with the first FET.

16. A Radio Frequency Identification (RFID) Integrated Circuit (IC) chip for use with an RFID tag that has an antenna for receiving an RF wave, the IC chip comprising:
two nodes defining a chip admittance between them, at least one of the nodes for coupling to the antenna;
a control circuit for outputting a control signal;
a processor for generating a data output signal in response to the received RF wave; and
a modulator operable to backscatter the received RF wave by alternating the chip admittance responsive to the data output signal between an ON admittance value of the chip admittance that is associated with an ON-state and an OFF admittance value of the chip admittance that is associated with an OFF-state, in which an admittance difference between the ON admittance value and the OFF admittance value is controlled responsive to the control signal, and in which the modulator includes:
a combiner circuit coupled to receive the data output signal and the control signal, and to output a first capacitance control signal in response thereto;
a variable capacitor with a first terminal coupled to one of the nodes, a second terminal coupled to the other one of the nodes, and whose capacitance depends on the first capacitance control signal.

17. The IC chip of claim 16, in which
the variable capacitor includes:
a first capacitor with a first terminal coupled to one of the nodes, and a second terminal coupled to receive the capacitance control signal; and
a second capacitor with a first terminal coupled to the other one of the nodes and a second terminal coupled to receive the capacitance control signal.

18. The IC chip of claim 16, in which
the variable capacitor includes:
a first capacitor and a first switch coupled in series between the two nodes, and
a second capacitor and a second switch coupled in series between the two nodes, and
the first switch and the second switch are controlled differently from the combiner circuit.

19. A Radio Frequency Identification (RFID) tag, comprising:
an antenna for receiving an RF wave;
a chip with two nodes defining a chip admittance between them and coupled to the antenna;
a control circuit on the chip for outputting a control signal;
a processor on the chip for generating a data output signal in response to the received RF wave;
a modulator on the chip operable to backscatter the received RF wave by alternating the chip admittance responsive to the data output signal between an ON admittance value of the chip admittance that is associated with an ON-state and an OFF admittance value of the chip admittance that is associated with an OFF-state, in which an admittance difference between the ON admittance value and the OFF admittance value is controlled responsive to the control signal; and
a controllable admittance circuit distinct from the modulator, coupled between the two nodes, and in which the control signal is received by the controllable admittance circuit.

20. The RFID tag of claim 19, in which
the admittance difference is controlled by modifying the ON admittance.

21. The RFID tag of claim 19, in which
the admittance difference is controlled by modifying the OFF admittance.

22. The RFID tag of claim 19, in which
the admittance difference has a first value if a power level of the received RF wave is less than a selected value, and a second value less than the first value if the power level is higher than the selected value.

23. The RFID tag of claim 19, in which
the ON admittance is adapted to have a first value if a power level of the received RF wave is less than a selected value, and a second value less than the first value if the power level is higher than the selected value.

24. The RFID tag of claim 19, further comprising:
a controllable admittance circuit distinct from the modulator, including at least a first FET that is coupled in series with the modulator between the two nodes, and
in which a gate of the first FET receives and is controlled by the control signal.

25. A method for a Radio Frequency Identification (RFID) tag circuit that has two nodes which define a chip admittance between them, comprising:
receiving an RF wave from an RFID reader;
detecting a power level of the received RF wave;
outputting a control signal responsive to the detected power level, in which the control signal is one of: an analog signal whose level varies based on the power level of the received RF wave, a signal whose frequency varies based on the power level of the received RF wave, a signal based on a peak of the received RF wave, and a signal whose value is based on a logarithm of the power level of the received RF wave;
controlling, responsive to the control signal, an admittance difference by controlling one or both of an ON admittance value of the chip admittance that is associated with an ON-state and an OFF admittance value of the chip admittance that is associated with an OFF-state;
generating a data output signal in response to the received RF wave; and
backscattering the received RF wave by alternating the chip admittance responsive to the data output signal between the ON admittance value and the OFF admittance value.

26. The method of claim 25, in which
the admittance difference is controlled by modifying the ON admittance.

27. The method of claim 25, in which
the admittance difference is controlled by modifying the OFF admittance.

28. The method of claim 25, in which
the admittance difference has a first value if a power level of the received RF wave is less than a selected value, and a second value less than the first value if the power level is higher than the selected value.

29. The method of claim 25, in which
the ON admittance is adapted to have a first value if a power level of the received RF wave is less than a selected value, and a second value less than the first value if the power level is higher than the selected value.

30. The method of claim 25, in which
the ON admittance is adapted to have a first value if a power level of the received RF wave is less than a selected value, and a second value less than the first value if the power level is higher than the selected value.

31. A Radio Frequency Identification (RFID) Integrated Circuit (IC) chip for use with an RFID tag that has an antenna for receiving an RF wave, the IC chip comprising:
two nodes defining a chip admittance between them, at least one of the nodes for coupling to the antenna;
a control circuit for outputting a control signal, in which the control circuit includes an RF power level detector circuit operable to detect a power level of the received RF wave and the control signal is one of: an analog signal whose level varies based on the power level of the received RF wave, a signal whose frequency varies based on the power level of the received RF wave, a signal based on a peak of the received RF wave, and a signal whose value is based on a logarithm of the power level of the received RF wave;
a processor for generating a data output signal in response to the received RF wave; and
a modulator operable to backscatter the received RF wave by alternating the chip admittance responsive to the data output signal between an ON admittance value of the chip admittance that is associated with an ON-state and an OFF admittance value of the chip admittance that is associated with an OFF-state, in which an admittance difference between the ON admittance value and the OFF admittance value is controlled responsive to the control signal.

32. The IC chip of claim 31, in which
the admittance difference is controlled by modifying at least one of the ON admittance and the OFF admittance.

33. The IC chip of claim 31, in which
the ON admittance is adapted to have a first value if a power level of the received RF wave is less than a selected value, and a second value less than the first value if the power level is higher than the selected value.

34. The IC chip of claim 31, in which
the control signal is received by the modulator.

35. The IC chip of claim 31, further comprising:
a demodulator for demodulating the received RF wave, and
in which the RF power level detector circuit includes at least a portion of the demodulator.

36. The IC chip of claim 31, in which
the RF power level detector circuit includes a first diode and a first capacitor coupled to each other, the first diode further coupled to one of the nodes, and the first capacitor further coupled to the other one of the nodes.

37. The IC chip of claim 36, in which
the first diode is coupled to one of the nodes through a second capacitor.

38. The IC chip of claim 31, further comprising:
a controllable admittance circuit distinct from the modulator, including at least a first FET that is coupled in series with the modulator between the two nodes, and
in which a gate of the first FET receives and is controlled by the control signal.

39. The IC chip of claim 38, in which
the controllable admittance circuit further includes at least a second FET that is coupled in parallel with the first FET.

40. The IC chip of claim 31, in which
the control circuit includes a convert circuit that outputs the control signal in response to the detected power level of the received RF wave.

41. The IC chip of claim 40, in which
the power level detector circuit outputs a detected power signal, the convert circuit includes two FETs, each with a source coupled to the gate of the first FET, each with a drain coupled to a drain of the first FET and to one of the nodes, and one of which receives the detected power signal at a gate.

* * * * *

UNITED STATES PATENT AND TRADEMARK OFFICE
CERTIFICATE OF CORRECTION

| | | |
|---|---|---|
| PATENT NO. | : 7,990,249 B1 | Page 1 of 1 |
| APPLICATION NO. | : 11/765552 | |
| DATED | : August 2, 2011 | |
| INVENTOR(S) | : Hyde et al. | |

It is certified that error appears in the above-identified patent and that said Letters Patent is hereby corrected as shown below:

1) Please delete "fine" (column 8, line 14) and insert -- line --, therefor.

Signed and Sealed this
Twentieth Day of March, 2012

David J. Kappos
*Director of the United States Patent and Trademark Office*